United States Patent
Paquette et al.

(10) Patent No.: US 7,586,481 B1
(45) Date of Patent: Sep. 8, 2009

(54) DISPLAY-POINTER VISIBILITY

(75) Inventors: Michael J. Paquette, Benicia, CA (US); Howard A. Miller, Saratoga, CA (US); David Hayward, San Francisco, CA (US)

(73) Assignee: Apple Inc., Austin, TX (US)

( * ) Notice: Subject to any disclaimer, the term of this patent is extended or adjusted under 35 U.S.C. 154(b) by 573 days.

(21) Appl. No.: 11/126,096

(22) Filed: May 10, 2005

(51) Int. Cl.
*G06F 3/033* (2006.01)
(52) U.S. Cl. .................................. 345/157; 715/856
(58) Field of Classification Search ......... 345/156–184; 342/183; 715/711, 754, 856–863
See application file for complete search history.

(56) References Cited

U.S. PATENT DOCUMENTS

| | | | |
|---|---|---|---|
| 5,870,083 A * | 2/1999 | Shieh | 345/173 |
| 5,905,486 A * | 5/1999 | Brittenham et al. | 345/157 |
| 6,597,383 B1 * | 7/2003 | Saito | 715/860 |
| 2002/0063740 A1 * | 5/2002 | Forlenza et al. | 345/856 |
| 2005/0212766 A1 * | 9/2005 | Reinhardt et al. | 345/157 |
| 2006/0095867 A1 * | 5/2006 | Rogalski et al. | 715/858 |

* cited by examiner

*Primary Examiner*—Chanh Nguyen
*Assistant Examiner*—Long Pham
(74) *Attorney, Agent, or Firm*—Williams, Morgan & Amerson, P.C.

(57) ABSTRACT

A method, apparatus, and system are provided for accentuating a pointer. An idle time period associated with a pointer relating to a display is monitored. A determination is made whether a termination of the idle time period associated with the pointer has occurred based upon the monitoring. A representation of the pointer is modified in response to the termination of the idle time period associated with the pointer.

23 Claims, 6 Drawing Sheets

DISPLAY-POINTER VISIBILITY

BACKGROUND OF THE INVENTION

1. Field of the Invention

This invention relates generally to electronic displays, and, more particularly, to a method, apparatus, and system for providing improved visibility of a pointer relating to the display.

2. Description of the Related Art

There have been various advancements in the area of document creation, image creation and capture technology, and processing them in a computer system. Image creation and capture technology includes creating images and/or documents using various applications and/or capturing images processed by cameras and scanners. Generally, images are created or downloaded onto a computer, such as a Macintosh® computer system, and a user may browse through the various images captured by the camera or the scanner. The user may use a pointer or a cursor to perform various tasks associated with manipulating the documents or images, as well as to perform administrative functions relating to various files associated with the documents or images.

There have also been various advancements in communications between computer systems. Networks, such as the Internet, intranets, or other private or public networks, are ubiquitous. In fact, many computers are connected to one or more networks at the same time. For example, a business may have hundreds or even thousands of computers coupled to its own private network, which was, at least initially, used primarily for storage and exchange of computer files. At least some of these same business computers may also be coupled to the internet. Further, with the development of wireless devices, ad hoc networks may also be formed with properly configured portable devices. Even telephonic devices, such as cellular phones, pagers, and the like, may be coupled to one or more of these networks. A user may control various computers and displays using the network computers.

When using a computer or a control system that includes a display device, a user may spend a significant amount of time analyzing the content displayed on a computer screen, or other points of interest around a work area. In other words, when a user works with a computer or a control system that interfaces with a display, the user generally performs other tasks that may not include the moving of a pointer or a cursor on the display. The pointer may relate to a mouse pointer or a pen pointer. Therefore, after a certain period of time, the user may lose track of the cursor. This is made more problematic when a user operates a system with a plurality of displays. Often, stock analysis analyst, engineers, legal personnel, doctors, and other professionals utilize large computer screens and sometimes a plurality of computer screens or displays. When analyzing data content in the various screens, the operator may lose track of a mouse pointer or a cursor.

One of the problems associated with the state-of-the-art includes the fact that the cursor associated with a mouse or other input devices is small relative to the display screen and other objects displayed on the screen. For example, many cursors are formed from a set of 16×16 pixels. Users often lose track of the cursor when not using it for a period of time. Furthermore, this is compounded by the problem that in some cases, the human eye is relatively insensitive to changes in movement of small objects in a relatively large field. Not being able to quickly locate the cursor may lead to inefficiency in the use of a computer or a control system. A quick assessment of the location of the cursor is desirable to react quickly to various events that a user may perceive. Additionally, a certain amount of frustration may develop as a result of a delay in locating the cursor, which may delay the user from continuing a task. As display screens become larger and larger and as additional display screens are used for a particular task, a user will generally find it more difficult to quickly decipher the location of a cursor to carry out a particular task. This problem may be exacerbated by the fact that many users now use a plurality of display devices for a particular computer.

The present invention is directed to overcoming, or at least reducing, one or more of the problems set forth above.

SUMMARY OF THE INVENTION

In one aspect of the present invention, a method is provided for accentuating a pointer. An idle time period associated with a pointer relating to a display is monitored. A determination is made whether a termination of the idle time period associated with the pointer has occurred based upon the monitoring. A representation of the pointer is modified in response to the termination of the idle time period associated with the pointer.

In a further aspect of the present invention, a method is provided for accentuating a pointer. A determination is made that a cursor is in an idle state in response to a determination that a predetermined time period has elapsed since the cursor has been moved. A stimulation signal capable of terminating the idle state is detected. A representation of the cursor is modified to increase the visibility of the cursor.

In another aspect of the present invention, a system is provided for accentuating a pointer. The system comprises a display device for displaying data and a pointer and a data input device capable of controlling the pointer. The system also comprises a controller operatively coupled to the display device. The controller is adapted to monitor an idle time period associated with a pointer and determine whether a termination of the idle time period associated with the pointer has occurred. The controller is also adapted to modify a representation of the pointer in response to the termination of the idle time period associated with the pointer.

In yet another aspect of the present invention, a computer readable program storage device encoded with instructions is provided for accentuating a pointer. The computer readable program storage device encoded with instructions that, when executed by a computer, performs a method, comprising: determining that a cursor is in an idle state in response to a determination that a predetermined time period has elapsed since the cursor has been moved; detecting a stimulation signal capable of terminating the idle state; and modifying a representation of the cursor to increase the visibility of the cursor.

In a further aspect of the present invention, a method is provided for accentuating a pointer. A request to accentuate a pointer is received. A representation of the pointer is modified to increase the visibility of the pointer.

In a further aspect of the present invention, a cursor controller is provided for accentuating a pointer. The cursor controller includes an interface relating to receiving data relating to controlling a cursor. The cursor controller also includes a controller that is operatively coupled to the interface. The cursor controller is adapted to monitor an idle time period associated with a pointer and determine whether a termination of the idle time period associated with the pointer has occurred. The controller is also adapted to modify a representation of the pointer in response to the termination of the idle time period associated with the pointer.

In yet a further aspect of the present invention, another cursor controller is provided for accentuating a pointer. The cursor controller includes a controller that is adapted to receive a request to accentuate a pointer. The controller is adapted to modify a representation of the pointer to increase the visibility of the pointer.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated, that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a method, system, and apparatus for providing a dynamic display of a pointer or cursor, such as a mouse cursor, such that the location and identification of the cursor may be readily deciphered. Embodiments of the present invention provide for a visual and/or audible signal as to the position of a cursor. This provides for a user to readily identify the location of a cursor or pointer (e.g., such as a mouse or a pen cursor) and continue normal operation. As an example, a user may lose track of a cursor or a pointer while observing data on a display device. Utilizing embodiments of the present invention, which provides for animating a pointer subsequent to an idle time based upon an input from the user or a predetermined time period, a pointer is relatively quickly found. A user may indicate to a computer system that locating the cursor is desired. This indication may include any type of jester that may recognizable by the device displaying the cursor or pointer.

Alternatively, a passage of a predetermined period of time or a signal from an entity (e.g., a hardware entity, a software entity, a firmware entity, or an entity comprising a combination thereof) may trigger the process of animating or highlighting the pointer or cursor. In one example, a return to active state from an idle state may trigger the accentuation of the pointer/cursor. Based upon a determination that a cursor is to be highlighted, one or more of several visual or audible accentuations may be performed to allow the user to readily identify the location of the cursor.

Figure 1:
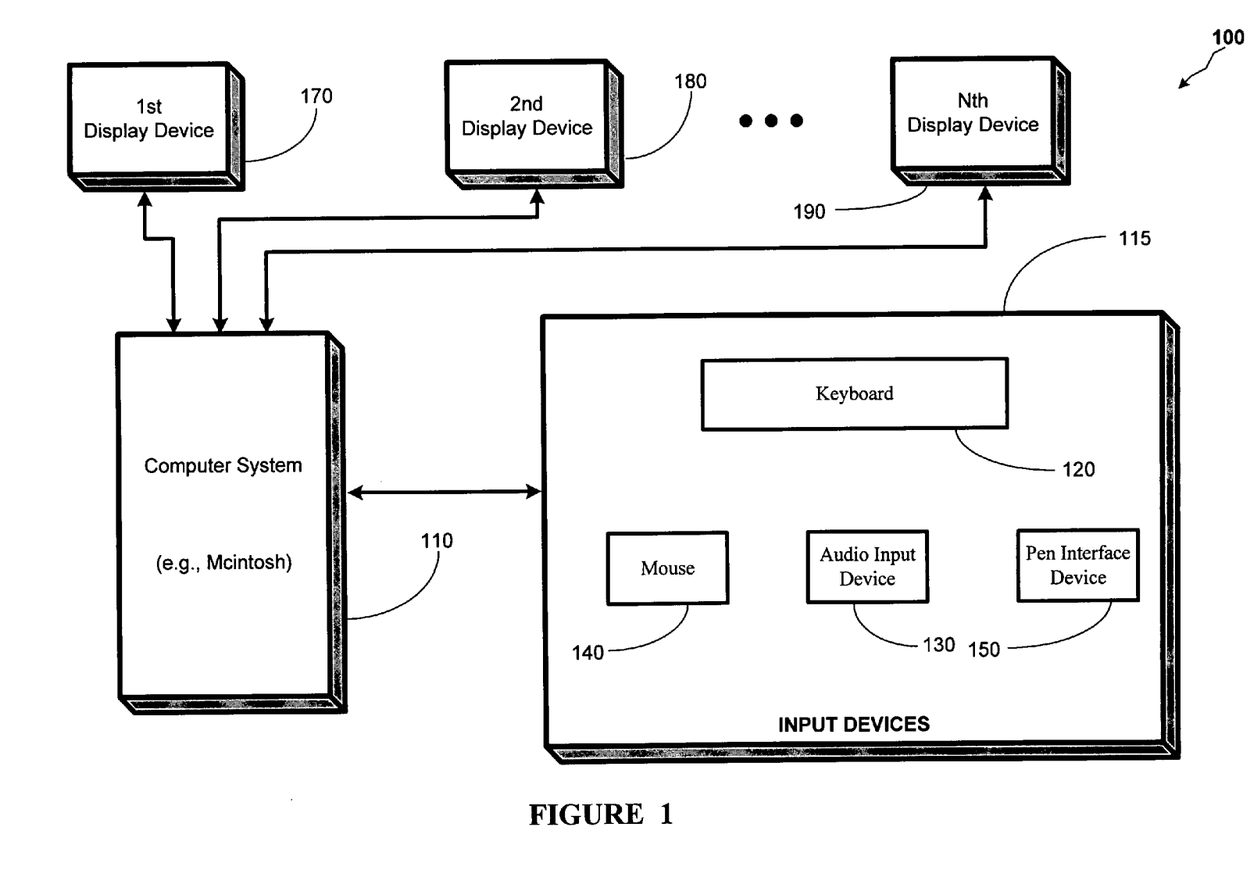
FIG. 1 illustrates a system in accordance with one embodiment of the present invention.

Turning now to FIG. 1, a system 100, in accordance with one embodiment of the present invention is illustrated. The system 100 comprises a computer system 110 that may be coupled to one or more of a plurality of input devices 115. Based upon the input devices 115, the computer system 110 provides control of one or more tasks. Display data relating to these tasks provided by the computer system 110 may be displayed on a $1^{st}$ display device 170, a second display device 180, or to an $N^{th}$ display device 190.

The interface devices 115 may refer to one or more data input devices, such as a keyboard 120, a microphone 130 for entry of audible data, a mouse 140, and/or a pen device 150. In an alternative embodiment, the mouse 140 may be a trackball device. Those skilled in the art would appreciate that any type of input device may be used in the system 100 and remain within the spirit and scope of the present invention. One or more of the $1^{st}$ thru $N^{th}$ displays 170-190 may display a pointer or a cursor associated with an input device 115. The pointer or cursor may be configured to move across the various $1^{st}$ through $N^{th}$ display devices 170-190. The pointer/cursor may be controlled by the computer system 110, which prompts the cursor to react in relation to the input provided by one or more of the input devices 115. Following a predetermined time period of idle time, or upon receiving a stimulation signal from a user or a device, the computer system 110 may animate the cursor to provide a highlighting effect. The highlighting effect may assist the user to readily identify the location of the cursor. The highlighting effect may encompass a variety of highlighting techniques discussed below. One or several possible inputs generated by the input devices 115 may be used to initiate the highlighting of the cursor or pointer.

The display devices 170-180 may be any type of device capable of displaying graphics, such as computer display monitor (e.g., a cathode ray tube [CRT] monitor, a flat panel monitor, a digital television set, etc.). The computer system 110 may be a desktop computer or server, such as an Apple Macintosh®, a classic Apple Mac®, a Power Mac G4®, a Power Mac G5®, an iMac®, an IBM compatible personal computer (PC), and the like. Further, these desktop computers, such as the Apple Macintosh®, may be coupled via a variety of networks (e.g., a local area network [LAN]), a sub-LAN, or the LAN being coupled to the Internet). In an alternative embodiment, the computer system 110 may be a portable device, such as an Apple PowerBook® or iBook®.

Figure 2:
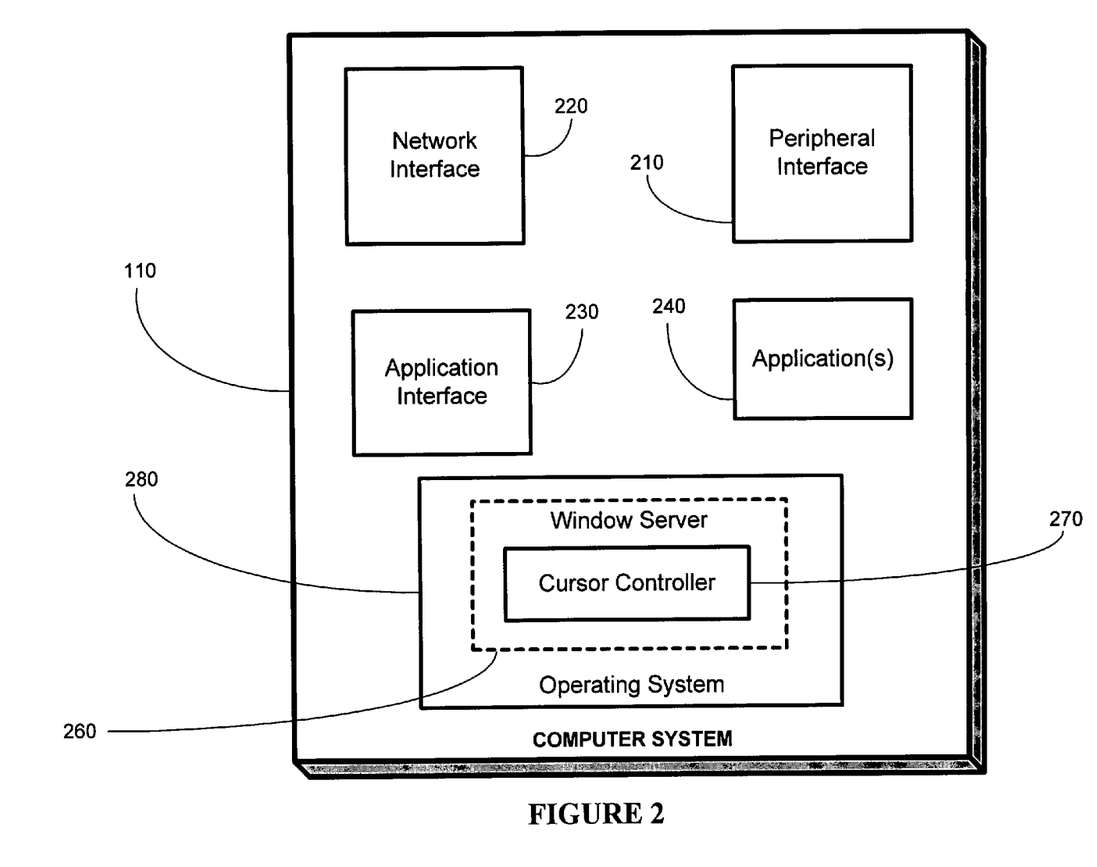
FIG. 2 illustrates a more detailed block diagram depiction of a computer system of FIG. 1, in accordance with the one embodiment of the present invention.

Turning now to FIG. 2, a more detailed block diagram depiction of the computer system 110, in accordance with an embodiment of the present invention is illustrated. The computer system 110 may comprise various components, wherein some of these components are illustrated and others are not as to provide clarity and prevent obscurity of the present invention. The computer system 110 may comprise a peripheral interface 210 that is capable of communicating with the various peripheral devices, such as the input devices 115 illustrated in FIG. 1.

Continuing referring to FIG. 2, the computer system 110 may also comprise a network interface 220, an application interface 230, one or more application(s) 240, and an operating system 280 capable of controlling various operations of the computer system 110. The operating system 280 may be one of the OS-10® family of operating systems, offered by Apple Computer, Inc.

The peripheral interface 210 may comprise various software, hardware, and/or firmware objects that are capable of interfacing with various peripheral devices interfaced with the computer system 110. The peripheral devices may include the input devices 115 and the $1^{st}$ through Nth displays 170-190.

The network interface 220 allows for interaction of the computer system 110 with various other computer systems and/or other devices. The network interface 220 is capable of receiving and sending transmission requests and facilitating network communications. The application interface 230 is capable of facilitating communications between the operating system 250, various peripheral devices, and applications 240 that may reside on the computer system 106.

The operating system 280 may comprise a window server 260 that is capable of controlling the operation of various window groups and cursors/pointers displayed by the computer system 110. The window server 260 may be used by the computer system 110 to highlight various window groups associated with a particular document application 240 executed by the computer system 110. The window server 260 may also control an animation of the cursor or pointer to provide attention to the cursor, based upon a stimulation event or a predetermined event (e.g., passing of a predetermined period of time) detected by the computer system 110. The stimulation event may include a particular movement of the cursor caused by a rapid movement of an input device 115, such as a mouse 140. The stimulation event may also include an audio command to locate the cursor, a predetermined depression of a predetermined key on the keyboard 120 (e.g., a double-depression of a "control" key), depression of a key or button from any device, input from a touch screen related to a display device 170, a rapid movement of the pen device 150, and/or a variety of inputs that may indicate a desire to highlight the cursor or pointer. The stimulation may be any type of jester that is capable altering the device providing the cursor/pointer of a request for highlighting/accentuating the cursor/pointer. In one embodiment, a reaction that includes highlighting or animating of the pointer or cursor is performed in response to a stimulation event that occurs after a termination of a predetermined idle time associated with the cursor or pointer. Additionally, the request to highlight or accentuate the cursor/pointer may be provided by an application or any application pointer interface (API). In an alternative embodiment, the highlighting or animation of the cursor may be performed in response to stimuli from an external source, such as a predetermined keystroke from a user or a signal from a software or hardware entity. The term "highlighting" may refer to a variety of methods to provide attention to the cursor/pointer, including brightening the pointer, enlarging or decreasing the size of the pointer, other type methods of scaling the pointer, changing the color of the pointer, rotating the pointer, and/or any type of display that may bring attention to the pointer.

The window server 260 may also comprise a cursor controller 270. The cursor controller 270 is capable of controlling the cursor or pointer. The cursor controller 270 controls the movement of the cursor, as well as the size, graphics, and animation of the cursor. The cursor controller provides for monitoring a stimuli received by the computer system 110 that may indicate that deciphering the location of the cursor is desired. This request generally occurs after a predetermined idle time, after which a user may have trouble immediately locating the cursor. The cursor controller 170 is capable of determining whether such stimulation is received, and performing an animation of a cursor or pointer in one of various fashions to provide the user with an indication of the location of the cursor. In one embodiment, the cursor may be implemented in software, hardware, firmware, and/or in any combination thereof. More details relating to the cursor controller 270 is provided in subsequent Figures and accompanying description below.

Figure 3:
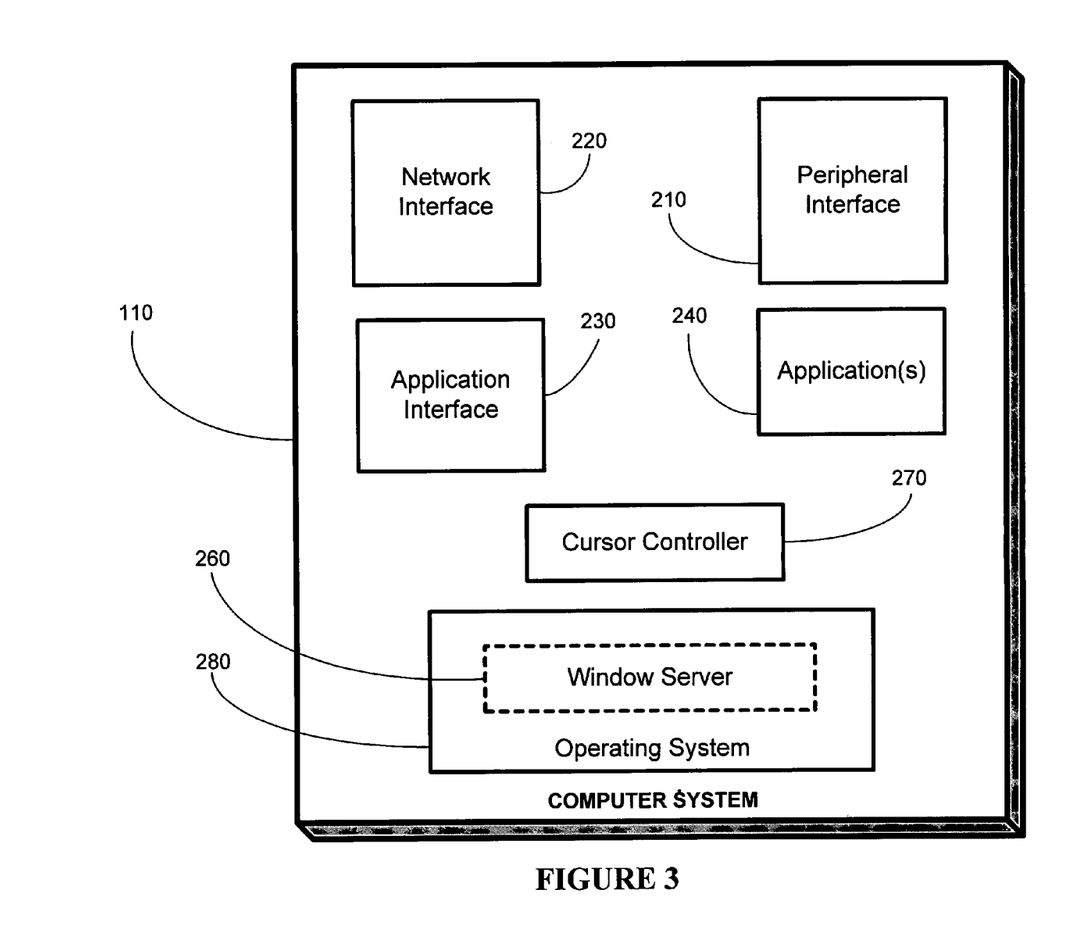
FIG. 3 illustrates a block diagram depiction of an alternative embodiment of the computer system of FIG. 1.

In the one embodiment, the cursor controller 270 is located within the window server 260 of the operating system 280. In an alternative embodiment, the cursor controller 270 may be located outside the window server 260 or even outside the operating system 280, as illustrated in FIG. 3. In other words, the cursor control 270 illustrated in FIG. 3 may reside directly in the computer system 110 and interface with the operating system 280. This may provide the ability for independent applications 240 to interface directly with the cursor controller 270. Therefore, the cursor controller 270 may be programmed to perform various animation and detection functions using an application 240. In one embodiment, the cursor controller 270 may be comprised of software, hardware, and/or firmware components.

As illustrated in FIG. 2, the cursor controller 270 may be a part of the window server 260 and may be tasked to control various aspects of the display devices 170-190 that are driven by the computer system 110. Although FIGS. 2 and 3 illustrate exemplary locations of the cursor controller 270, it would be appreciated by those skilled in the art having benefited from the present disclosure that the cursor controller 270 may be located at various portions of the computer system 110. The cursor control 270 is capable of detecting a signal, or a stimulus (i.e., a stimulation event being detected) received by the computer system 110, and is capable of making determination as to whether a user desires to quickly locate a cursor. Based upon this determination, an accentuation, which is described in more details below, is performed, allowing the user to more readily find the location of a cursor on a particular display device 170-190. The network server 220, the peripheral server 210, the application interface 230, the application 240, the operating system 280, the window server 260, and/or the cursor controller 270 may be comprised of hardware, software, and/or firmware objects, or any combination thereof.

Figure 4:
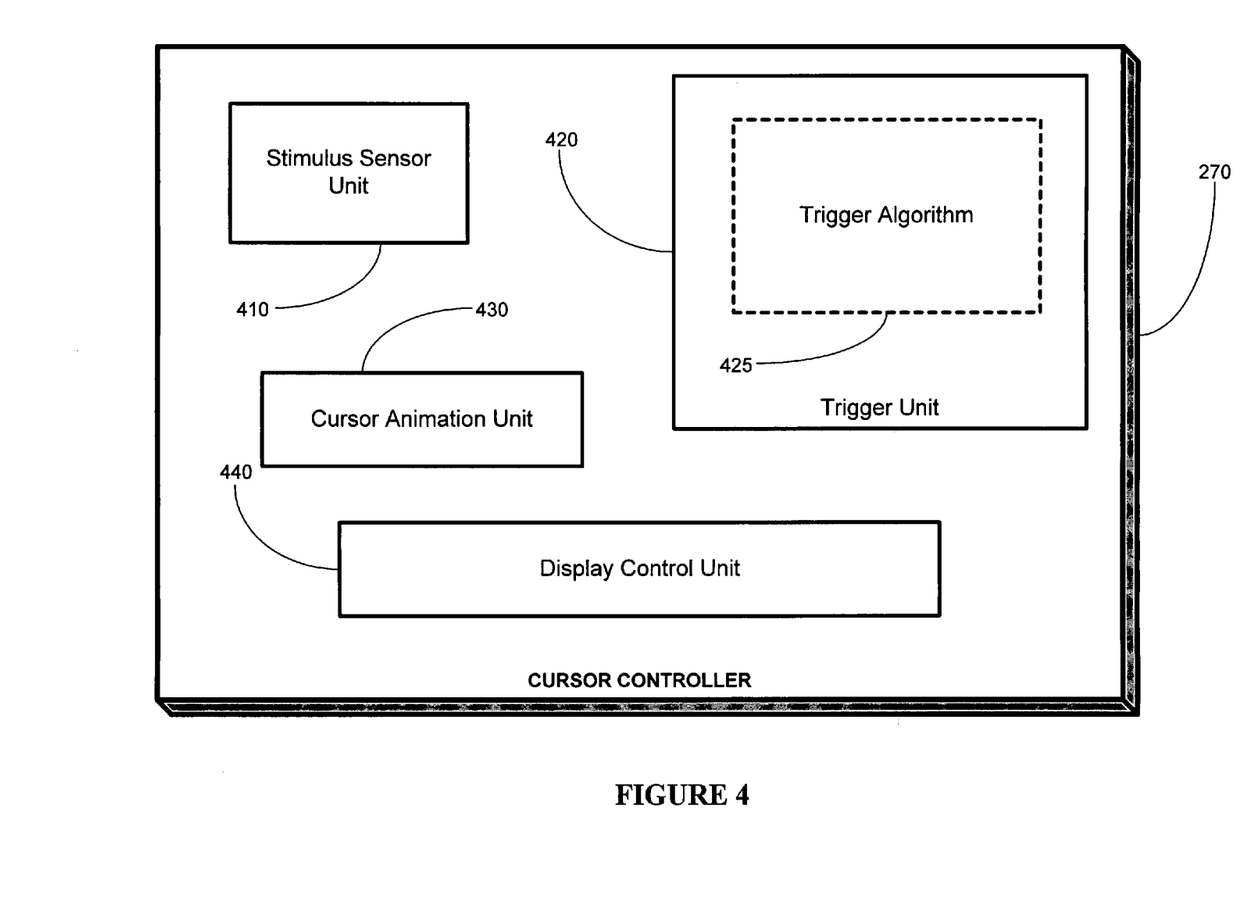
FIG. 4 illustrates a more detailed block diagram depiction of a cursor controller of FIGS. 2 and 3, in accordance with an embodiment of the present invention.

Turning now to FIG. 4, a block diagram depiction of one embodiment of the cursor controller 270, in accordance with an embodiment of the present invention is, illustrated. The term "cursor" used within the present patent application may refer to a pointer, a location of an active field, or any other type of pointing display mechanism that may be used to input, point, or control data illustrated on a display device 170.

In one embodiment, the cursor controller 270 may comprise a stimulus sensor unit 410, a trigger unit 420, a cursor animation unit 430, and a display control unit 440. These units may be logical software units, hardware units, firmware units, and/or a combination thereof. The stimulus sensor unit 410 may comprise components that are capable of detecting a stimulation event from an external source, such as an input device 115 or a software application. This stimulation event may indicate to the computer system 110 that a user may desire to find the location of a particular cursor. In one embodiment, the cursor controller 270 may react to the stimulation event after a predetermined period of idle time has expired (e.g., after 30 seconds have passed since the cursor has been moved). The predetermined period of idle time may be programmable to any value.

The stimulus unit 410 is capable of detecting a plurality of stimulation events. For example, depressing or tapping a particular key of a keyboard 120 may be interpreted by the stimulus sensor unit 410 as a possible stimulation expressing a desire to locate the cursor. The cursor controller 270 may be able to provide a comparison of the received stimulation with a corresponding stored stimulation data in order to evaluate the authenticity of the stimulation. Other inputs from a mouse key being depressed, a pen input unit 150, and the like, may be detected by the stimulus sensor unit 410.

The stimulation sensor unit 410 may also receive a single or a combination of a predetermined key depression indications relating to a particular key on a keyboard 120. This input, in combination with a pre-determined lapse of time since the last time that the cursor was moved by the user, may be interpreted by the cursor controller 270 as an indication that the user is attempting to locate the cursor. Therefore, at the touch of a single key, the user may invoke an animation to highlight the position of the cursor. Other input that provides a stimulation event to cause an animation of the cursor may include a rapid movement of an input device 115, such as the rapid movement of a mouse 140 or a pen input device 150. Various types of movements of the mouse may be detected and deciphered as a stimulation event in order to prompt a triggering of the animation of the cursor. For example, a series of horizontal or particular vertical movements may be interpreted as a potential stimulus, indicating that a user is moving the mouse in a certain manner to decipher the location of the cursor.

These input signals, alone or in combination with a predetermined delay in the previous movement of the cursor, may provide for an assertion of a trigger signal by the trigger unit 420. In one embodiment, an algorithm may be provided, e.g., a trigger algorithm 425, by the trigger unit 430 for determining whether to perform an animation of a cursor. As an example, a trigger algorithm 425 may calculate a second derivative relating to the movement of the mouse 140. The movement of the mouse 140 by a user may indicate a desire to invoke the animation of a cursor to readily locate the cursor. A first derivative of the movement of the mouse may indicate the acceleration function relating to the movement of the mouse 140. The second derivative may provide an indication of the change of acceleration relating to the movement of the mouse 140. This change in acceleration may be an indication that the mouse 140 or another other input device 150 is being moved in a predetermined manner, e.g., a left to right movement in rapid succession. The movement may be timed and associated with the second derivative of the movement function, and may be combined to determine whether the user is attempting to locate the cursor. Upon calculation of the second derivative, a predetermined amount of time may be used to wait to see if the movement continues, after which the trigger unit 420 may trigger the animation of the cursor. Other stimulation may include an audio stimulation wherein a user may provide an audio command that may be interpreted by the stimulus sensor unit 410 to determine whether a location of the cursor.

Based upon the stimulation data provided by the stimulus sensor unit 410, the trigger unit 420 may trigger the initiation of an animation to provide for efficient deciphering of the location of the cursor. The trigger unit 420 may comprise various types of algorithms represented by the trigger algorithm block 425. The trigger algorithm 425 is capable of performing various calculations and asserting a trigger signal that is provided to the cursor animation unit 430. Upon reception of a trigger signal, the cursor animation unit 430 may provide data to initiate one of a various type of animations to provide a user with a rapid indication of the location of the cursor.

The cursor animation unit 430 may generate a time-based animation to provide an illusion of the cursor moving closer-in or farther-away, in order to provide the user with the ability to rapidly decipher the location of the cursor. Data from the cursor animation unit 430 is provided to a display control unit 440, which is capable of implementing a particular type of animation on the displays 170-190. The display control unit 440 may interface with a graphics driver, such as a video graphics driver, in order to implement the animation of the cursor for ready perception of its location.

Various types of animations may be provided by the cursor controller 270. For example, the same graphics that represent the cursor may be scaled in an up or down fashion to provide the user with a rapid determination of the location of the cursor. This animation may take place for a predetermined period of time, such as 2 seconds for example, and then the normal appearance of the cursor is re-implemented. Often, graphics drivers provide for a scaling of the cursor. For example, the predetermined scaling factors provided by the graphics drivers to magnify or reduce the cursor size may be utilized to provide an animation of the cursor. Therefore, upon the detection of a stimulus indicating a request to locate or provide a rapid deciphering of the cursor location, a magnification and/or de-magnification of a particular cursor may be performed for a predetermined period of time. Generally, during the animation of the cursor, the "hot spot" of the cursor may remain relatively the same. Hence, the function of the cursor remains the same even though an animation is provided to allow the user to readily identify the location of the cursor.

Another example of a type of animation is providing a moving ring around the cursor for a predetermined period of time, where the moving ring is animated or surrounded by a brighter flashing background to quickly provide an indication to the user as to the location of the cursor. Another example may include a color change of the cursor for a predetermined amount of time. Yet another example of the type of animation that may be provided to allow for a user to detect the location of the cursor may include a dimming of a substantial portion of the display device 170, with the exception of a small area around the cursor. This may be particularly useful in instances where a plurality of display devices 170-190 are used, wherein all displays devices 170-190 are dimmed, except for the location of the cursor. In other words, all of the multiple display devices 170-190 would be dimmed, including portions of the display device containing the cursor or pointer. In this case, a user may quickly identify which particular display device 180 contains the cursor by locating the bright location of the cursor, wherein all other display devices 170-190 are temporarily dimmed.

Animation of the cursor in generally performed for only a predetermined period of time. Other indications may include audio queues that may come from one of the display devices 170 currently containing the cursor in order to provide an indication to the user as to the location of the cursor. Other types of animation may be performed by the cursor controller 270 and remain living in the spirit and scope of the present invention. Based upon the type of animation provided by the cursor animation unit 430, the display controller unit 440 implements such an animation to provide the user with the ability to quickly decipher the location of the cursor. The display controller unit 440 provides data for controlling the types of display and other animation illustrated on the display devices 170-190.

Figure 5:
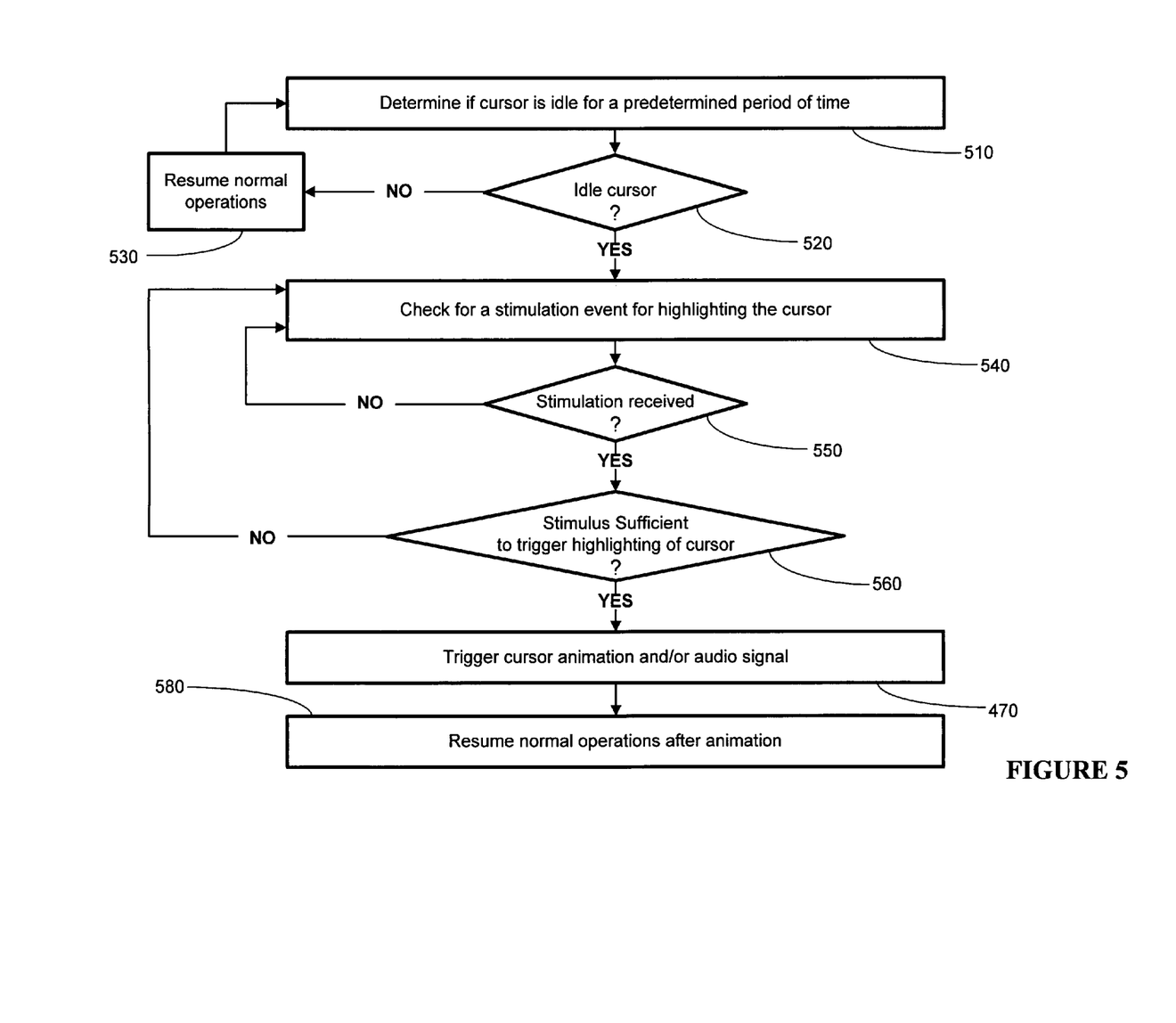
FIG. 5 illustrates a flowchart depiction of the steps associated with a method in accordance with embodiments of the present invention.

Turning now to FIG. 5, a flowchart depiction of the steps of a method associated with an embodiment of the present invention is illustrated. An algorithm of the system 100 may make a determination if a cursor is in an idle mode for a predetermined amount of time (block 510). The predetermined amount of time, for example, may be a 30 second window. However, any window of time may be programmed into the system 100 to provide the functions of embodiments of the present invention. In an alternative embodiment, the predetermined amount of time may be approximately zero, where an input stimulus from a user or application may trigger the highlighting or animating of the cursor. The system 100 determines whether the cursor is indeed in an idle mode (block 520). Upon a determination that the cursor is not in an idle mode, normal operations of the computer system 110, as well as the normal display of the cursor, is resumed (block 530). Therefore, the algorithm then loops back to block 510 to determine if the cursor enters an idle mode. In an alternative embodiment, the steps described in blocks 510, 520, and 530 may be bypassed and a direct check for a stimulation event may be made without regard to the idleness of the cursor.

Upon a determination that the cursor is indeed in an idle mode, the system 100 may perform a check for a stimulation event in order to determine whether to highlight or animate the cursor to provide an indication of its location (block 540). In one embodiment, the stimulation event may be an active cue (e.g., an audible cue, an active input from a user, application, or a device, etc.) to accentuate the pointer. In an alternative embodiment, the stimulation event may be a passive cue (e.g., the passage of a predetermined time period, etc.) to accentuate the pointer. A more detailed description and illustration of the steps for checking for a stimulation event as indicated in block 540, is provided in FIG. 6 and accompanying description below. Upon checking for a stimulation event as indicated in block 540, the system 100 determines when a stimulus for highlighting a cursor has indeed been received (block 550). If the system 100 determines that the stimulus has not been received, then the algorithm loops back so that it can continue checking for a particular stimulation event. During the steps illustrated in FIG. 5, in the event that the cursor enters and subsequently exits an idle mode, the system 100 may reset to the steps of determining whether the cursor initially enters an idle mode (i.e., resetting to block 510).

Upon a determination that the stimulation event has been received for highlighting, animating, or otherwise accentuation a cursor, the system 100 may determine whether the stimulus is indeed sufficient to trigger highlighting, animation or otherwise accentuating the cursor (block 560). Therefore, when the stimulation event is received, the cursor controller 270 may perform an analysis to determine whether to trigger an animation of the cursor based upon the stimulus received. Therefore, the cursor controller 270 is capable of discriminating between the stimulation events in order to reduce the possibility of false or unnecessary animations of the cursor.

When the system 100 determines that a stimulation event is not sufficiently significant to trigger a highlighting of the cursor, the system 100 may loop back to block 540. The system 100 may then continue to check for possible stimuli for highlighting or animating the cursor. Upon a determination that the stimulus is indeed sufficiently significant to trigger a highlighting or animation of the cursor, the system triggers the cursor animation (block 570). Upon triggering the cursor animation, after a predetermined period of time, the system 100 may then resume normal operation and display of the cursor (block 580). The animation and/or highlighting of the cursor are performed for a predetermined period time.

Figure 6:
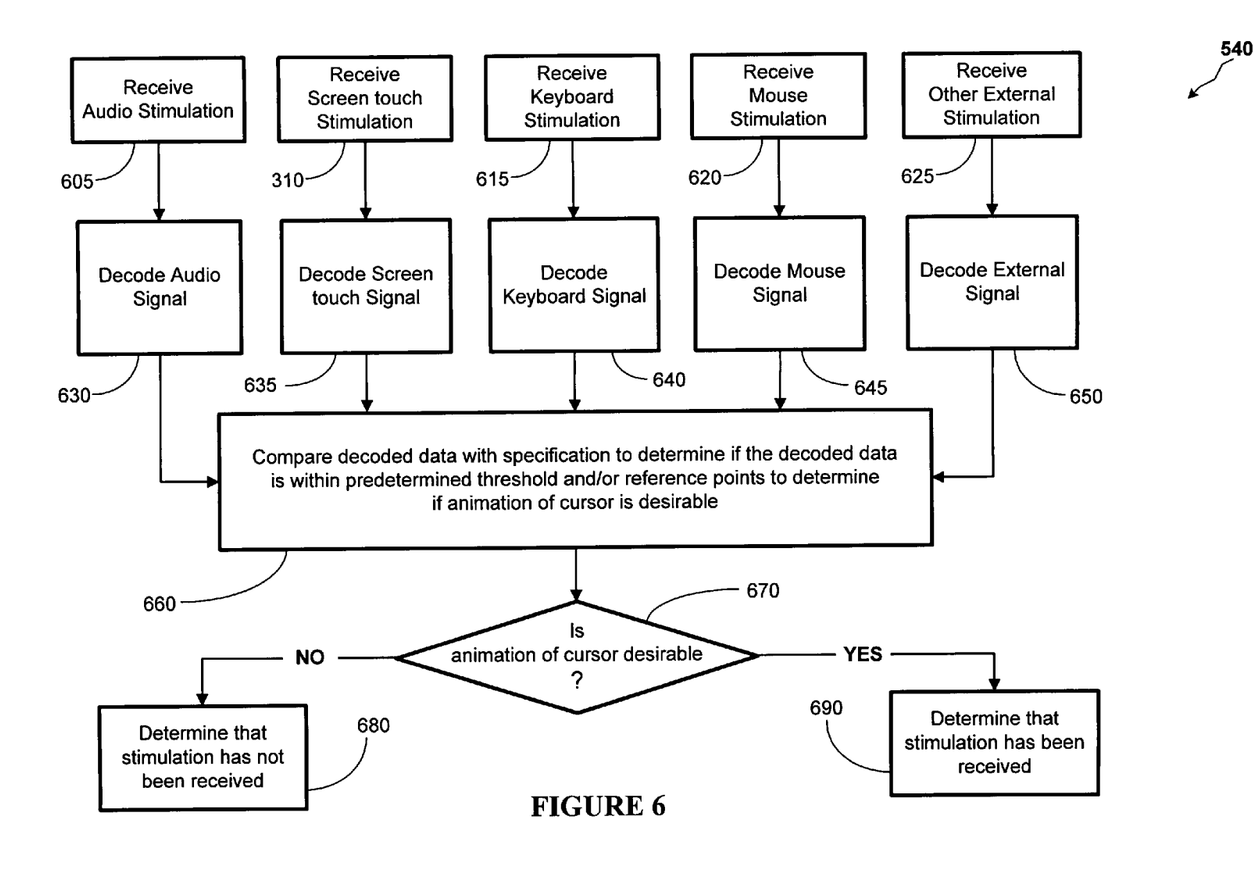
FIG. 6 illustrates a more detailed flowchart depiction of steps checking for a stimulus for highlighting a cursor provided in FIG. 5 in accordance with one embodiment of the present invention.

Turning now to FIG. 6, a flowchart depiction of the steps for checking for stimulus indicated in block 540 of FIG. 5 is illustrated. The cursor controller 270 may receive an audio stimulation (block 605), after which the audio signal is decoded (block 630). The decoding of the audio signal may incorporate converting the audio signal to data that may be compared to a look-up table in the cursor controller 270 to determine if a match may be made. Alternatively, the cursor controller 270 may receive a touch-screen stimulation that may provide a stimulus (block 610). The touch-screen signal may include a predetermined tapping of a particular location on the screen of the display device 170. Data from the touch screen signal is then decoded (block 630).

Alternatively, the cursor controller 270 may receive a keyboard stimulation that may entail pressing a predetermined key (block 650). The cursor controller 270 then checks to see which key was depressed and decodes the resultant data (block 640). This decoding may include determining which key is pressed, the sequence of the pressing of the key, and/or at what rate was the key pressed (e.g., the key may have been depressed five times within 2 seconds to indicate a desire to locate the cursor). The cursor controller 270 may receive a mouse stimulation, which may include the depression of a predetermined button on the mouse 140 (block 620). The cursor controller 270 may then decode the data from the mouse. The mouse stimulation may also alternatively include a rapid movement of the mouse. The decoding performed by block 645 of the mouse data may include the deciphering of the direction and the acceleration of the movement of the mouse, using the second derivative function described above. Other external stimulation, e.g., a pen input, etc., may be provided to the cursor controller 270 (block 625). The cursor controller 270 then decodes data from the external input (block 650).

The cursor controller 270 may compare the decoded data with predetermined specifications to determine if the decoded data is within a predetermined threshold and/or reference point to determine if an animation of the cursor is desired (block 660). These comparisons against predetermine thresholds and/or reference points provide for the ability to discriminate between an actual stimulation event and a false stimulation event in order to reduce the possibility of unnecessary animations of the cursor.

Based upon the comparison of the decoded data with the predetermined threshold and/or to the reference point, the cursor controller 270 may then determine whether a stimulation or highlighting of the cursor is desirable (block 670). If a determination is made that the stimulation is not required or desirable, then a determination is made that an actual stimulation event has not been received and normal operation is then generally resumed (block 680). However, if the cursor controller 270 determines that the stimulation is desirable, then a determination is made that an actual stimulation event has been received (block 690). Based upon this declaration, the cursor controller 270 then implements the stimulation or highlighting of the cursor as described above and in FIG. 5.

Utilizing embodiments of the present invention, a user is able to decipher relatively quickly, the location of the cursor. When utilizing a vast amount of data, on a large screen in particular, or utilizing a plurality of displays 170-190, during pauses or moments where the user is distracted away from the cursor, it may be difficult for the user to re-find the cursor.

Embodiments of the present invention allows for relatively rapid deciphering of the cursor or pointer. Embodiments of the present invention may be used in a plurality of types of devices, such as computer systems, personal digital assistant (PDA) devices, communication devices (e.g., telephones, pagers, personal communication devices, etc.), embedded devices (e.g., iPOD® devices offered by Apple Computer, Inc.), and/or the like.

Additionally, embodiments of the present invention may be implemented to highlight or animate multiple pointers or cursors associated with a display, such as video game displays. The user may greatly benefit from the efficient deciphering of the location of the cursor provided by embodiments of the present invention. This may lead to increased productivity based upon the fact that the cursor does not have to be located each time the user is momentarily distracted from his/her location, thereby reducing distractions and delays. Additionally, the embodiments of the present invention may be implemented in a variety of displays such as computer displays, control system displays, factory control displays, television displays, PDA displays, cellular telephone displays, and the like. Embodiments of the present invention may be implemented in a wide variety of devices, such as computers, telephones, portable computing devices, and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design shown herein, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed is:

1. A computer readable program storage device encoded with instructions that, when executed by a computer, performs a method, comprising:
   monitoring an idle time period associated with a pointer relating to a display;
   determining whether a termination of said idle time period associated with the pointer has occurred based upon said monitoring, wherein determining whether the termination has occurred comprises determining whether a stimulation event has occurred, wherein determining whether the stimulation event has occurred comprises determining whether a change in an acceleration relating to a device associated with said pointer has occurred, wherein determining whether a change in the acceleration has occurred comprises:
      calculating at least one of an acceleration of the pointer or a change in the acceleration of the pointer; and
      comparing the at least one of an acceleration of the pointer or a change in the acceleration of the pointer to a pre-defined value; and
   modifying a representation of said pointer in response to said termination of said idle time period associated with said pointer.

2. The computer readable program storage device of claim 1, wherein the computer is communicatively coupled to an input device.

3. The computer readable program storage device of claim 1, wherein modifying a representation of said pointer further comprises at least one of modifying the size of said pointer, animating said pointer, modifying a color associated with said pointer, dimming at least a portion of one or more regions associated with said display to highlight said pointer, dimming a plurality of display devices to highlight a regions associated with said pointer, highlighting a plurality of pointers associated with said display, and or providing an audible cue for locating said pointer.

4. A display apparatus, comprising a controller adapted to:
   monitor an idle time period associated with a pointer relating to a display;
   determine whether a termination of said idle time period associated with the pointer has occurred based upon said monitoring, wherein determining whether the termination has occurred comprises determining whether an input event has occurred, wherein determining whether the input event has occurred comprises determining whether a change in an acceleration relating to a device associated with said pointer has occurred, wherein determining whether a change in the acceleration has occurred comprises:
      calculating at least one of an acceleration of the pointer or a change in the acceleration of the pointer; and
      comparing the at least one of an acceleration of the pointer or a change in the acceleration of the pointer to a pre-defined value;
   and
   modify a representation of said pointer in response to said termination of said idle time period associated with said pointer.

5. The display apparatus of claim 4, wherein the controller is communicatively coupled to an input device.

6. The display apparatus of claim 4, wherein said controller is further adapted modify the size of said pointer, animate said pointer, modify a color associated with said pointer, dim at least a portion of one or more regions associated with said display to highlight said pointer, dim a plurality of display devices to highlight a regions associated with said pointer, highlight a plurality of pointers associated with said display, or provide an audible cue for locating said pointer.

7. The display apparatus of claim 4, wherein said controller is adapted to brighten a circular portion of said display upon which said pointer is displayed, wherein said circular portion of the display is a circular region around said pointer, wherein brightening of said circular portion is relative to the brightness of the remaining portion of said display.

8. The display apparatus of claim 4, wherein said input event is based upon a depression of an input key of an external source from the group consisting a keyboard, a pen input device, a voice input device, or a touch screen input unit.

9. The display apparatus of claim 4, further comprising an interface operatively coupled to said controller, said interface to receive data relating to controlling said pointer and provide said data to said controller.

10. A method, comprising:
   monitoring an idle time period associated with a pointer relating to a display;
   determining whether a termination of said idle time period associated with the pointer has occurred based upon said monitoring, wherein determining whether the termination has occurred comprises determining whether an input event has occurred, wherein determining whether the input event has occurred comprises determining whether a change in an acceleration relating to a device associated with said pointer has occurred, wherein determining whether a change in the acceleration has occurred comprises:

calculating at least one of an acceleration of the pointer or a change in the acceleration of the pointer; and comparing the at least one of an acceleration of the pointer or a change in the acceleration of the pointer to a pre-defined value; and modifying a representation of said pointer in response to said termination of said idle time period associated with said pointer.

11. The method of claim 10, wherein the computer is communicatively coupled to an input device.

12. The method of claim 10, wherein modifying a representation of said pointer further comprises at least one of modifying the size of said pointer, animating said pointer, modifying a color associated with said pointer, dimming at least a portion of one or more regions associated with said display to highlight said pointer, dimming a plurality of display devices to highlight a regions associated with said pointer, highlighting a plurality of pointers associated with said display, or providing an audible cue for locating said pointer.

13. The method of claim 10, further comprising brightening a circular portion of said display upon which said pointer is displayed, wherein said circular portion of the display is a circular region around said pointer, wherein brightening of said circular portion is relative to the brightness of the remaining portion of said display.

14. The method of claim 10, wherein determining whether the input event has occurred comprises determining whether an input based upon a depression of an input key of an external source from the group consisting of a keyboard, a pen input device, a voice input device, or a touch screen input unit, has occurred.

15. The display apparatus of claim 4, further comprising an interface operatively coupled to said controller, said interface to receive data relating to controlling said pointer and provide said data to said controller.

16. A system, comprising:

a display device for displaying data and a pointer;

a data input device capable of controlling said pointer; and a controller operatively coupled to said display device, said controller adapted to:

monitor an idle time period associated with said pointer displayed on said display device;

determine whether a termination of said idle time period associated with the pointer has occurred based upon said monitoring, wherein determining whether the termination has occurred comprises determining whether an input event has occurred, wherein determining whether the input event has occurred comprises determining whether a change in an acceleration relating to a data input device has occurred, wherein determining whether a change in the acceleration has occurred comprises:

calculating at least one of an acceleration of the pointer or a change in the acceleration of the pointer; and comparing the at least one of an acceleration of the pointer or a change in the acceleration of the pointer to a pre-defined value; and modify a representation of said pointer in response to said termination of said idle time period associated with said pointer.

17. The system of claim 16, wherein said data input device is at least one of a mouse, a pen device, a trackball device, an audio input device, and a keyboard.

18. The system of claim 16, wherein said controller is capable of determining whether a user is attempting to locate said pointer based upon an input signal received by said controller.

19. The system of claim 18, wherein said input signal is one of a movement of a mouse, a movement of a pen peripheral device, an audio command, and a predetermined data entry of a key relating to a keyboard.

20. The system of claim 16, wherein said controller is adapted to perform at least one of modifying the size of said pointer, animating said pointer, modifying a color associated with said pointer, dimming at least a portion of one or more regions associated with said display device to highlight said pointer, and providing an audible cue for locating said pointer.

21. The system of claim 16, wherein said controller is integrated into a computer system.

22. The system of claim 21, wherein said cursor controller is a portion of an operating system associated with said computer system.

23. The system of claim 16, wherein said computer system comprises a cursor controller capable of modifying said pointer.

* * * * *

UNITED STATES PATENT AND TRADEMARK OFFICE
CERTIFICATE OF CORRECTION

PATENT NO. : 7,586,481 B1 Page 1 of 1
APPLICATION NO. : 11/126096
DATED : September 8, 2009
INVENTOR(S) : Paquette et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Fourteenth Day of September, 2010

David J. Kappos
*Director of the United States Patent and Trademark Office*